Patented Sept. 6, 1932

1,876,088

UNITED STATES PATENT OFFICE

FRANCIS GEORGE COAD STEPHENS, LENNOX JAMES ANDERSON, AND WILLIAM ALAN CASH, OF LONDON, ENGLAND; ALICE BURT STEPHENS, EXECUTRIX OF SAID FRANCIS GEORGE COAD STEPHENS, DECEASED, ASSIGNORS TO NATIONAL METAL AND CHEMICAL BANK LIMITED, OF LONDON, ENGLAND, A BRITISH COMPANY

MANUFACTURE OF TITANIUM OXIDE

No Drawing. Application filed July 27, 1928, Serial No. 295,838, and in Great Britain August 2, 1927.

This invention relates to the manufacture of titanium oxide ($TiO_2$) or salts or pigments containing titanium, the chief object being to provide an economical and easily and well regulated process capable of yielding a pigment of exceptional whiteness, brilliance, hiding and covering power. More particularly an object of the invention is to extract the titanium contained in compounds or ores such as ilmenite or titanium sulphate by treating the same in such a manner as to avoid the difficulties met with when using ordinary strong sulphuric acid. A further object is to treat the extracted titanium sulphate with an alkaline earth compound to associate therewith titanium hydroxide under improved conditions or in an improved manner. A still further object is to incorporate with the associated alkaline earth sulphate and titanium hydroxide an additional substance capable of improving its properties as a pigment.

The usual process of manufacture of titanium sulphate is to grind ilmenite (FeO, $TiO_2$) or other titaniferous ore either with or without previous concentration of the ($TiO_2$) content and decompose it with sulphuric acid to form sulphates of titanium and iron. In order to promote reaction between the sulphuric acid and ore it has been necessary to heat the mixture to about 140° C. When this is done, so violent a reaction ensues that even when the vessel containing the mixture is very large in proportion to the charge treated it is apt to overflow with volcanic-like action, involving danger to employees and damage to plant. Various methods of overcoming this difficulty have been suggested which are generally concerned with the reduction of the size of the charge and the avoidance of too rapid stirring, to minimize the violent reaction, which, when once started, proceeds exothermically.

The product of the reaction, consisting mainly of sulphates of titanium and iron, is generally in the form of hard cake which is extremely difficult to remove from the reaction chamber or pan and requires crushing before lixiviation. The resultant sulphate solution is then treated to remove the greater part of the iron. To the remaining solution is added an alkaline earth compound with the object of eventually precipitating the titanium as hydroxide upon or within the alkaline earth compound then in the form of sulphate, and it is known that the value of the resultant mass as a pigment is dependent largely upon the manner of associating these substances and their resultant physical condition.

According to the present invention the step of converting the titanium of the ore or compound and any iron present into their respective sulphates consists in effecting the reaction without the necessity of externally applied heat by the action of oleum and water under such conditions that a friable porous product suitable for immediate lixiviation without preliminary crushing is obtained. The main factors governing the conditions of the reaction are speed of admixture, degree of agitation, and quantities admixed. The order of admixture of the three components may be varied. Clearly the water and oleum would not be admixed in the absence of the ore; the water may, however, be added to the finely divided ore and the oleum then added thereto or the ore and water admixed may be added to the oleum, or the water may be added to the previously admixed ore and oleum provided the ore be dry at the time of admixture with the oleum. The preferable procedure owing to the ease of controlling the reaction is to mix the ore in a finely divided state with a relatively small quantity of water, say about 30 per cent, to form a pulp or slurry, and in rapidly adding to this mass, while it is vigorously agitated, oleum containing for example 20 per cent free $SO_3$ at such a speed that the final product is a friable mass in a porous condition very suitable for immediate lixiviation with water. The amount of water added to the finely divided ore to form the pulp or slurry may vary within limits determined by the condition of the final product, as little as 3 per cent and as much as 40 per cent being admissible. The quantity of oleum added is the amount required to convert the whole of the titanium and any iron present into sulphate but in practice we have found it convenient to use a small excess of the titanium ore or compound.

Ordinary sulphuric acid when heated with ground ilmenite yields a hard cake of sulphates of iron and titanium whereas by the present process the mass is porous and ready for lixiviation as above stated and there is no need for additional heat or external heating apparatus which, after attainment of the critical temperature of reaction, is inconvenient and in fact highly objectionable.

By our process notwithstanding the absence of additional heat or external heating apparatus, the water is rapidly driven off in the form of steam, and thus aids in the control of the reaction in a manner that we have found preferable to any other way. We do not confine ourselves to a precise temperature, but find it entirely practicable to adjust the amount of water employed in making the pulp or slurry to suit the character of the ore and the strength of the oleum, so that any operator can control the reaction by regulating the speed at which the oleum is added. Obviously we do not confine ourselves to an oleum containing 20% free $SO_3$, as considerable variation in the strength is practicable, and the strength to be employed is largely an economic question. We find that when carrying out this operation, the energy of the reaction is confined wholly to the charge, and corrosion of the pan and the stirrers is almost negligible. The size of the apparatus required is greatly reduced being perhaps about one quarter of that employed by older processes.

The mass of crude iron and titanium sulphates obtained in this manner is a dry porous mass ready to be immediately dissolved in cold water with agitation. Any small amount of ferric iron present is reduced to the ferrous state by iron or other convenient reducing agent. In adding the water, the strength of the solution we have found it preferable to attain corresponds to a specific gravity of about 1.5. When dissolving the mass, the temperature rises without any external heat to about 80° C. This solution is then if desired allowed to spontaneously separate out such ferrous sulphate as will crystallize on cooling to atmospheric temperature. Any such ferrous sulphate is then removed, and the resulting solution, free from the ferrous sulphate crystals, is given sufficient time to deposit such slimes as are always associated with the wet extraction of an ore. The settling may be promoted by one of the well known methods or media commonly employed. The solution after crystallization and clarification by settling, contains about 16% $TiO_2$ as titanic sulphate and 7% $FeO$ as ferrous sulphate, and a trace of titanous salt, and is now ready to be used for the direct manufacture of the pigment.

In connection with the production of titanium pigment from the above mentioned titanium solution we have investigated closely the best conditions for associating the titanium with alkaline earth sulphate or similar media to obtain a maximum bulk, brilliancy, whiteness, hiding and covering power and according to this part of our invention we proceed in a manner entirely different from that hitherto adopted and in fact in the reverse way. For convenience of further description we will assume that the alkaline earth sulphate with which the titanium oxide is eventually associated is barium sulphate. By our process we add the titanium sulphate solution to a soluble barium salt solution such as barium chloride solution under suitable conditions as hereinafter specified as we find that by operating in this order we obtain a surprisingly superior pigment. If the barium chloride solution were added to the titanium sulphate solution, the barium sulphate would be forming all the time in the presence of the remaining unaffected bulk of titanium solution and as this solution would normally contain an appreciable amount of iron the quality of the barium sulphate would doubtless be affected by such iron whereas by our process the barium sulphate is being formed in a barium chloride solution. To ensure the success of this procedure a suitable temperature is a very important factor and we prefer to maintain during the entire period of interaction between the two solutions or during at least a part of such period a temperature ranging between 25° C. and 40° C., preferably not less than about 30° C., and not more than about 35° C. The manner of mixing of the two solutions is an important factor. Sufficient time is allowed for the two solutions to thoroughly react and during such time or a part thereof the temperature is carefully maintained between the aforesaid limits. As soon as the reaction is complete, the entire mass is further heated or boiled (by steam coils or otherwise) to precipitate titanium hydroxide on or with the barium sulphate whereupon the composite precipitate is separated from the remaining liquor.

Actually the respective temperatures, strengths and manner of mixing of the solutions should be such that the eventual precipitate consists for the greater part of particles just sufficiently large to be filterable. For example a solution of about 100 parts of barium chloride to 750 parts of water may be brought to a temperature of between 30° C. and 35° C. and, while vigorously agitating, the titanium solution previously described containing about 16% $TiO_2$ may be slowly added in sufficient quantity to give a pigment containing the desired percentage of $TiO_2$. The mixture of resultant barium sulphate and titanium solution is then heated with steam to about 100° C. until a test portion indicates that substantially all the titanium is thrown out of solution. This composite precipitate is then filtered and washed substantially free from soluble iron salts. The precipitate is removed from the filter and may then be calcined for use as a pigment but is preferably suspended in water for further treatment as will now be explained.

If the above mentioned precipitate were immediately neutralized and calcined or heated to a suitable temperature it would yield a white pigment suitable for use in the manufacture of paints, but we have found that the brilliance, whiteness, hiding and covering power of paint prepared therefrom are considerably increased by incorporating into the pigment at this point and not before boron in the form of an acid radical. Instead therefore of immediately calcining the precipitate after removal from the filter we prefer to keep it suspended in water and add thereto boric acid or a borate or materal capable of yielding a borate.

The employment of borates in connection with paints hitherto has been limited to their use as driers, whereas our employment of boric acid or borates is to impart exceptional whiteness, brilliance, hiding and covering power to titanium pigments. We have found the calcium and barium compounds of boric acid to be particularly suitable. Such materials may be incorporated with the titanium oxide and alkali earth sulphate in proportions varying within wide limits and in a dry or wet state, but preferably in comparatively small proportions for economic reasons and in the wet state as above described to facilitate its distribution or dissemination within or upon the titanium oxide and alkaline earth sulphate. Any acidity remaining in the suspended precipitate to which the addition of boric acid or a borate is to be made is neutralized with a suitable base or carbonate such as barium or calcium carbonate. It is essential that the suspended precipitate be slightly alkaline rather than slightly acid and enough base or basic carbonate is therefore added to ensure at least complete neutralization. The boric acid or borate, for example calcium or barium borate in the proportion of say for example from about 2 to 4 parts by weight to 100 parts of $TiO_2$, is then added and intimately mixed or distributed throughout the suspension as by agitation or by boiling or both. Neutralization of acidity may if preferred be effected after addition of the boric acid or borate instead of before such addition.

The resultant precipitated material or mixture is then separated from the liquid as by filtration and is subsequently dried and heated to a sufficient temperature, for example from about 700° C. to about 900° C. depending upon the duration of heating, to render it suitable to be used as a pigment.

Although about 2 to 4 parts by weight of the boric materials are suggested and found to give satisfactory results, considerably more may be added if desired.

What we claim is:—

1. As a preliminary to the manufacture of titanium containing pigments, the steps of obtaining alkali earth sulphate and titanium hydroxide consisting in adding gradually a solution containing titanium sulphate and some iron sulphate as impurity to a solution of a soluble alkali earth metal salt and applying heat.

2. As a preliminary to the manufacture of titanium containing pigments, the steps of obtaining barium sulphate and titanium hydroxide consisting in adding gradually a solution containing titanium sulphate and some iron sulphate as impurity to a solution of barium chloride and then heating the mass.

3. As a preliminary to the manufacture of titanium pigments, the steps of obtaining alkali earth sulphate and titanium hydroxide consisting in maintaining a temperature of from about 25° C. to about 40° C. while adding gradually a solution containing titanium sulphate and some iron sulphate as impurity to a solution of a soluble alkaline earth metal salt, and then further heating the mass.

4. As a preliminary to the manufacture of titanium containing pigments, the steps of obtaining barium sulphate and titanium hydroxide consisting in maintaining a temperature of from about 25° C. to about 40° C. while adding gradually a solution containing titanium sulphate and some iron sulphate as impurity to a solution of barium chloride, and then further heating the mass.

5. As a preliminary to the manufacture of titanium containing pigments, the steps of obtaining barium sulphate and titanium hydroxide consisting in maintaining a temperature of from about 30° C. to about 35° C. while adding gradually a solution containing titanium sulphate and some iron sulphate as impurity to a solution of barium chloride, and then further heating the mass.

6. A complete process of manufacturing a titanium containing pigment consisting in mixing with finely divided titaniferous ore containing some iron as impurity a quantity of water only sufficient to form a slurry, adding thereto during vigorous agitation oleum in such quantity and at such a speed as to produce a friable porous mass without the expenditure of heat, lixiviating the same without preliminary crushing, allowing ferrous sulphate to crystallize out and separating the remaining liquor, adding the liquor gradually to a solution of barium chloride while maintaining a temperature of about 30° C. to 35° C., then further heating the mass, filtering, suspending the precipitate in water, adding thereto a relatively small quantity of boric acid, again filtering, and calcining the precipitate.

7. As a preliminary to the manufacture of titanium containing pigments the step of producing insoluble suspended alkaline earth metal sulphate by gradual precipitation thereof from and in a solution of a soluble salt of the alkaline earth metal by means of a solution of titanium sulphate containing iron sulphate as impurity, and precipitating titanium hydroxide in intimate association with said sulphate.

8. As a preliminary to the manufacture of titanium containing pigments the step of gradually adding a solution containing titanium sulphate with some iron sulphate as impurity to a solution of a soluble alkali earth metal salt and then applying sufficient heat to cause the eventual precipitate to consist of particles for the most part just sufficiently large to be filterable.

9. A complete process of manufacturing a titanium containing pigment consisting in mixing with finely divided titaniferous ore containing some iron as impurity a quantity of water only sufficient to form a slurry, adding thereto during vigorous agitation oleum in such quantity and at such a speed as to produce a friable porous mass without the expenditure of heat, lixiviating the same without preliminary crushing, allowing ferrous sulphate to crystallize out and separating the remaining liquor, adding the liquor gradually to a solution of barium chloride while maintaining a temperature of about 30° C. to 35° C., then further heating the mass, filtering, and calcining the precipitate.

10. For the manufacture of a titanium containing pigment from titaniferous ore, the production of precipitated alkali earth metal sulphate and titanium oxide consisting in mixing the titaniferous ore containing some iron as impurity in finely divided state with a quantity of water only sufficient to form a slurry, adding thereto during vigorous agitation oleum in sufficient quantity and at such a speed as to produce a friable porous mass without the expenditure of applied heat, lixiviating the same, allowing such ferrous sulphate as will crystallize out to do so, separating the solution of titanium sulphate and iron sulphate, adding it gradually to a weak aqueous solution of soluble alkali earth metal salt, then further heating and finally separating out the resultant precipitate.

11. For the manufacture of a titanium containing pigment from titaniferous ore, the production of precipitated barium sulphate and titanium oxide consisting in mixing the titaniferous ore containing some iron as impurity in finely divided state with a quantity of water only sufficient to form a slurry, adding thereto during vigorous agitation oleum in sufficient quantity and at such a speed as to produce a friable porous mass without the expenditure of applied heat, lixiviating the same, allowing such ferrous sulphate as will crystallize out to do so, separating the solution of titanium sulphate and iron sulphate, adding it gradually to a weak aqueous solution of barium chloride, then further heating and finally separating out the resultant precipitate.

In testimony whereof we have signed our names to this specification.

FRANCIS GEORGE COAD STEPHENS.
L. J. ANDERSON.
WILLIAM ALAN CASH.